United States Patent [19]

Smith

[11] 4,362,364

[45] Dec. 7, 1982

[54] APERTURE STOP ASSEMBLY FOR A LASER BEAM OPTICAL SYSTEM

[75] Inventor: Albert H. Smith, Tinton Falls, N.J.

[73] Assignee: Litton Systems, Inc., Melville, N.Y.

[21] Appl. No.: 160,772

[22] Filed: Jun. 18, 1980

[51] Int. Cl.³ .............................................. G02F 1/33
[52] U.S. Cl. ................................................ 350/358
[58] Field of Search ...................... 350/355, 356, 358

[56] References Cited

U.S. PATENT DOCUMENTS 3,220,003 11/1965 Montague et al. .................. 350/358

*Primary Examiner*—William L. Sikes
*Attorney, Agent, or Firm*—Robert F. Rotella; Michael H. Wallach

[57] ABSTRACT

An aperture stop assembly is shown which may be utilized within a laser beam optical system whose laser beam has been split into zero, first and second order beams. A lens is provided to focus the split beams upon a focal plane where an aperture stop is mounted having an aperture aligned with the desired first order beams. The reflective surface of the aperture is arranged at an angle to reflect the unwanted zero and second order beams into a series of absorption baffles found within the aperture stop housing or the aperture stop may absorb unwanted beams directly.

11 Claims, 3 Drawing Figures

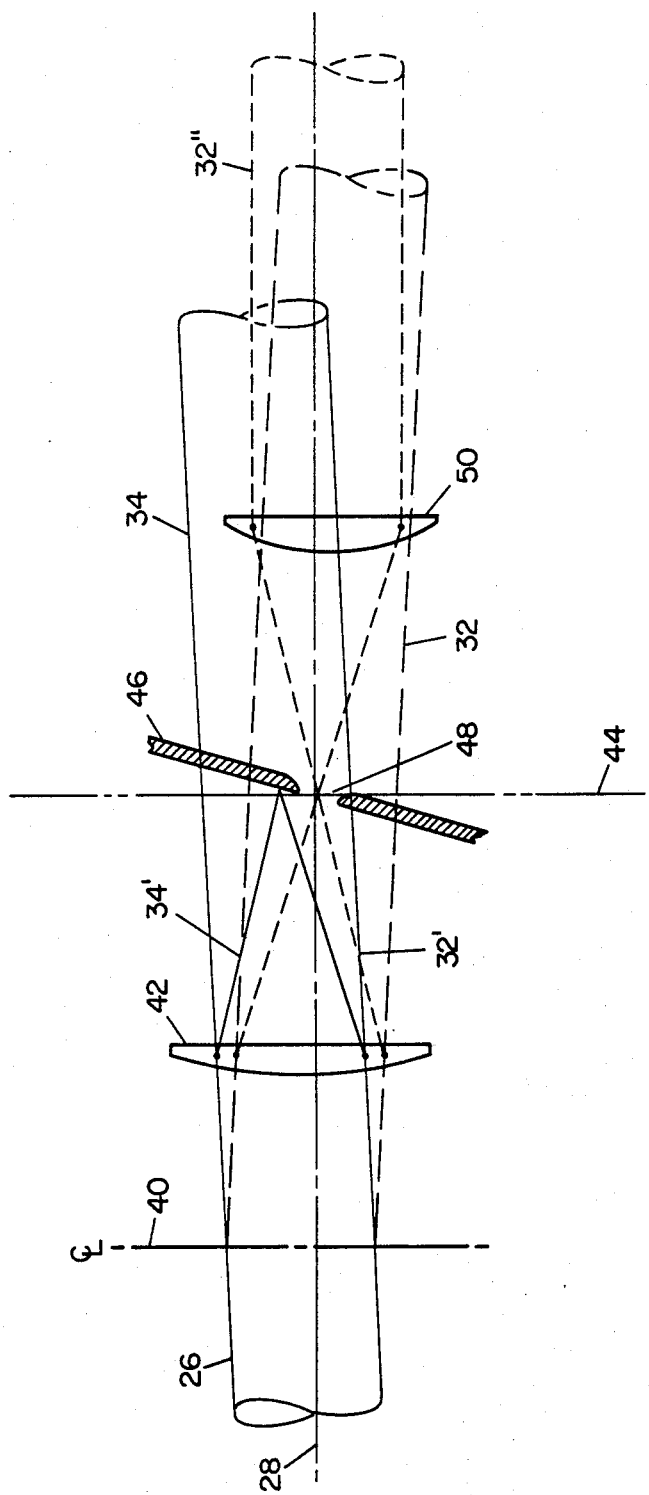

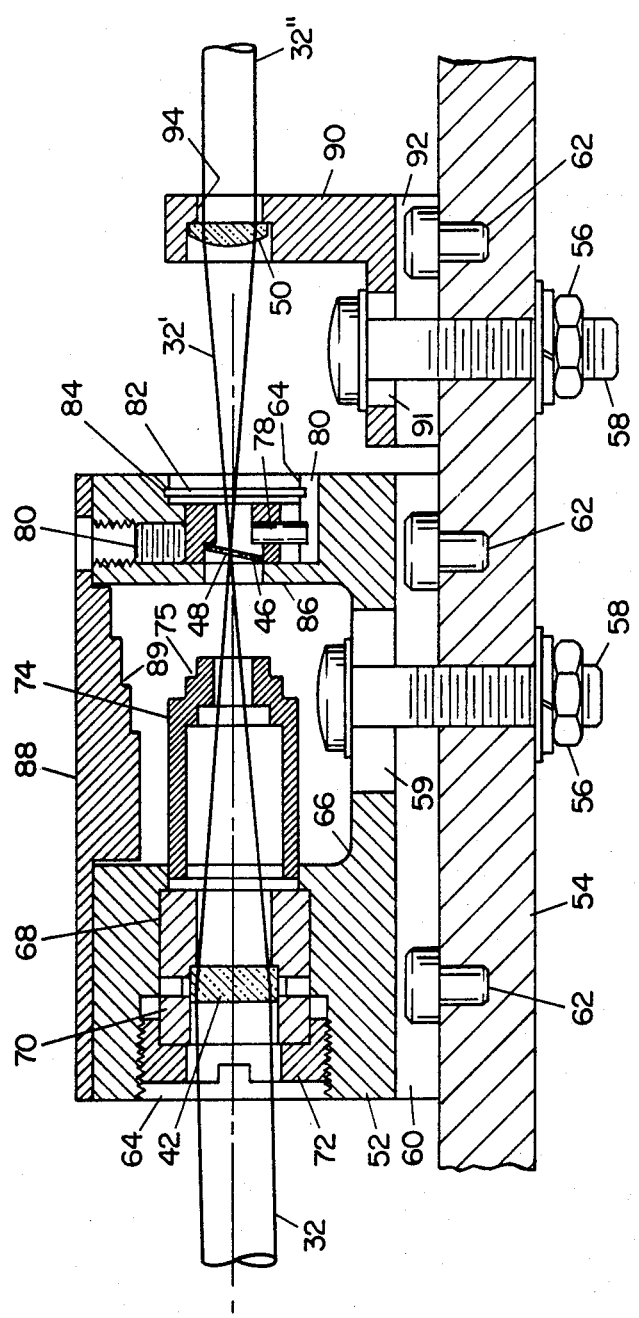

APERTURE STOP ASSEMBLY FOR A LASER BEAM OPTICAL SYSTEM

FIELD OF THE INVENTION

The present invention relates to an aperture stop assembly and, more particularly, to an aperture stop which may be utilized within a laser beam optical system to pass a plurality of desirable, generated laser beams while blocking a plurality of undesirable beams by reflection and absorption.

BACKGROUND OF THE INVENTION

It is well known in the prior art to utilize a laser within a facsimile or display system that may be used in turn for either recording, displaying or printing of alphanumeric text or pictures having varying shades of grey. In the prior art, an acousto-optic modulator is used to deflect a laser beam into a first order beam from its zero order beam position. That is, as a laser beam enters the crystalline structure of an unenergized acousto-optic modulator parallel plate crystal, at an angle thereto, the beam will be bent slightly at the point of entrance due to refraction but will continue through the crystal on a straight path to exit the far side of the crystal at an angle which is equal to the angle of incidence but on the opposite side of a horizontal center line through the modulator. This beam is called the zero order beam. When the acousto-optic modulator is energized and the laser beam is directed into the crystal at the bragg angle, the modulator crystal deflects the laser beam causing it to exit the modulator at an angle of diffraction which is equal to the angle of incidence and on the same side of the horizontal center line. This beam is the first order beam. For a more complete description of the operation of an acousto-optic modulator, attention is directed to application notes entitled "All About Bragg Angle Errors In Acousto-Optic Modulators & Deflectors", published September 1977 by ISOMET Corp., Springfield, Va. as publication AN772A.

In the prior art, the use of a stop to block the zero order beam while permitting the passage of the first order beam is well known. The difference between the exit angle of the beam or the angle of diffraction of a zero order beam and a first order beam is relatively small, on the order of 7 to 15 milliradians. Remember that one degree is equal to approximately 17 milliradians. Thus, to obtain a usable separation between the zero order and first order beam, it is necessary to separate the aperture stop from the acousto-optic modulator by a considerable distance, on the order of 10 to 15 inches. Further, in practice the acousto-optic modulator may not cleanly divide the incoming laser beam but may produce second order and third order beams as well as negative first and second order beams. The problem of plural random beams is further increased when, as in the present invention, multiple frequencies are applied to the acousto-optic modulator to develop a plurality of first order desirable beams.

SUMMARY OF THE INVENTION

Accordingly, it is an object of the present invention to provide an improved aperture stop assembly for a laser facsimile system which is capable of separating a plurality of desirable beams from a plurality of undesirable beams.

It is another object of the present invention to provide an aperture stop assembly which is capable of handling a plurality of desired laser beams for recording or displaying in a foreshortened length and relatively small volume while blocking a plurality of undesired laser beams into an absorptive baffle to prevent the backscattering of light from the undesired beams from interfering with the light of the desired beams.

In accomplishing these objects, the present invention provides an acousto-optic modulator which may be driven by a plurality of input frequencies for producing a multiple of first order beams. The multiplicity of beams are then focused by a lens upon a focal plane in which is mounted a reflective aperture stop. The aperture stop is arranged at an angle to the focal plane so that the undesirable zero order beams, second order beams and negative first and second order beams are reflected away from the path of the desired first order beams which pass through an aperture within the stop. The undesired, reflected beams are absorbed within the aperture stop housing. As an alternative, the undesirable beams may be absorbed by the stop plate itself.

BRIEF DESCRIPTION OF THE DRAWINGS

FIG. 2 is an optics diagram illustrating the deflection of the laser beam with and without the present invention; and FIG. 3 is a cross-sectional view showing the aperture stop assembly of the present invention.

DESCRIPTION OF THE PREFERRED EMBODIMENT

Figure 1:
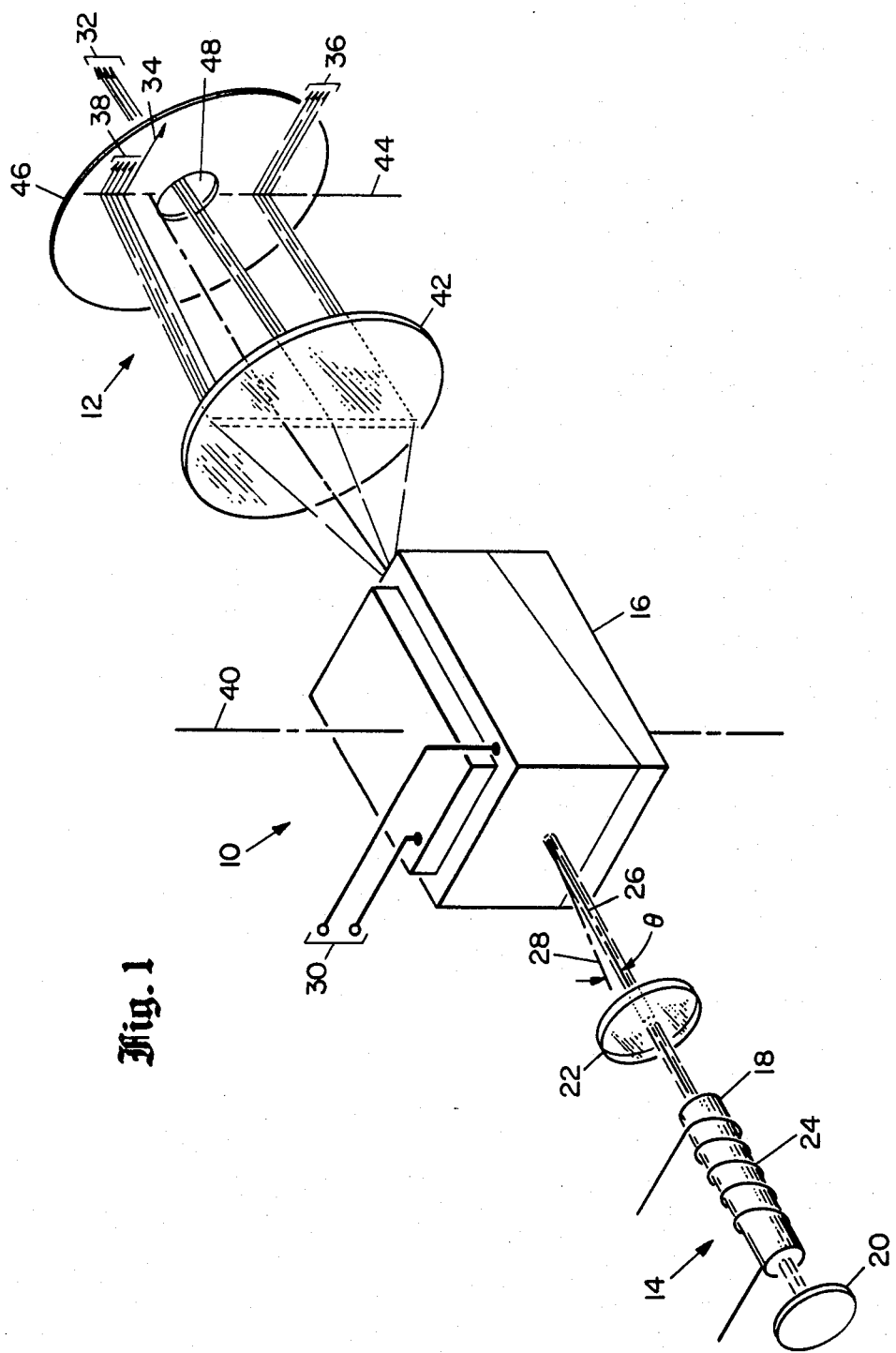
FIG. 1 is a perspective view illustrating the present invention.

In FIG. 1, the laser beam system is shown generally at 10 having an aperture stop assembly shown generally at 12 which passes a plurality of desirable laser beams while reflecting and absorbing a plurality of undesirable laser beams that were generated by a laser 14 and split by an acousto-optic modulator 16. The laser 14 may be either a continuous wave gas laser or a solid state laser such as that shown schematically in FIG. 1 including a laser rod 18 having a fully reflective mirror 20 located at one end and a partially reflective mirror 22 located at its output end. The laser rod 18 is driven by a flash lamp 24.

The coherent light of the laser 14, in the form of a collimated beam 26, is directed toward the acousto-optic modulator 16. As the laser beam 26 enters the acousto-optic modulator 16, it is offset from a horizontal center line 28 of the acousto-optic modulator by the bragg angle $\theta$. By applying several frequencies simultaneously or sequentially to the acousto-optic modulator 16 at input terminals 30, it is possible to produce a plurality of desirable first order beams 32. If no power is applied to the input terminals 30 of the acousto-optic modulator 16, the laser beam 26 will pass directly through the modulator unaffected thereby to produce what is referred to as a zero order beam 34. It will be understood that but a single arrow representing the zero order beam 34 is shown since, when the power is off, the laser beam 26 will pass directly therethrough and be undivided by the acoustic-optic modulator.

However, should a plurality of frequencies be applied across the terminals 30, four frequencies are illustrated here for example, the acousto-optic modulator will split the laser beam into four resulting first order beams as shown at 32. Due to the harmonics of the modulator, a series of undesired second order beams 36 will also be produced as will a series of negative first order beams 38.

The acousto-optic modulator 16 causes the separation of the first order beams 32 from the zero order beam 34 by a group angle equal to twice the bragg angle $\theta$. That is, the incoming laser beam 26 impinges upon the surface of the acousto-optic modulator 16 at a bragg angle of incidence, passes therethrough subject only to refraction, and exits therefrom at an exit angle which is equal to the angle of incidence but above the center line 28 since the incoming beam 26 is below the center line 28. When the modulator is energized, it causes the deflection of the laser beam 26 to the same side of the center line as the incoming beam so that the group angle of diffraction is equal to the negative of the angle of incidence. This separation between the zero order beam 34 above the center line and the first order beams 32 below the center line is 7 to 15 milliradians depending on the RF frequency applies to the modulator terminals 30.

Under these conditions, it is necessary to place the acoustic-optic modulator a substantial distance from the surface upon which the split light beam is to impinge in order to complete separation. This present art concept is shown in FIG. 2 wherein the laser beam 26 passes through the acousto-optic modulator illustrated only by the vertical center line 40. As the beam exits the modulator it is undeflected as illustrated by the continuing solid line representing the zero order beam 34. Application of a single frequency to the acousto-optic modulator causes deflection which generates the first order beam shown by the dashed line 32. It will be noted in FIG. 2 that the zero order beam 34 and first order beam 32 do not separate for a substantial length. A 40 mm diameter laser beam will not separate for approximately 10 inches.

To overcome this problem and reduce the length of the optical path of the laser beam and the size of the optical system, a lens 42 is placed a short distance beyond the acousto-optic modulator 16 for focusing the split laser beam 26 upon a focal plane indicated by the line 44. The zero order beam 34' is thus focused upon a point offset from the point of focus of the first order beam 32'.

Located at the focal plane 44 is an aperture stop plate 46 which is angularly arranged such that the focal plane 44 and the plane formed by the aperture stop 46 intersect at a vertical line which is the line formed when the laser beam is split into zero order, first order, second order and negative first and second order beams. In FIG. 2, the aperture stop 46 has been rotated 90° for clarity. The plane of the aperture stop 46 is arranged at an angle to the laser beams so that the laser beams impinging upon the reflective surface of the aperture stop are reflected away from the path of the beams that pass through the stop and into absorption baffles which will be described below with regard to FIG. 3. An aperture 48 is located within the aperture stop plate 46 and positioned at the point of focus of the first order beam 32'. Thus, it will be seen that the focused zero order beam 34' strikes the reflective surface of the aperture stop 46 and is reflected therefrom. If desired, a second lens 50 may be located beyond the aperture stop 46 to refocus the first order beam 32' into a collimated beam of coherent light 32" for utilization by the laser system 10.

FIG. 2 illustrates a single zero order and first order beam and does not illustrate the splitting of the laser beam 26 into a plurality of beams as shown in FIG. 1. The reason for this is simplicity since the drawing of a plurality of split beams would of necessity require a substantial number of dashed or broken lines. It will be understood by those skilled in the art that FIG. 2 may be expanded to include three additional first order beams each slightly offset from the other and each focused upon the focal plane 44 at the aperture 40.

Referring now to FIG. 3, the details of the aperture stop housing assembly will be described wherein a housing 52 is shown mounted upon a suitable frame 54 by a suitable fastener, such as a nut 56 and screw 58. The housing 52 has a longitudinal slot 59 which receives the screw 58 while its lower surface is channeled at 60 to create a groove which allows the housing 52 to slide forward and backward along pins 62 mounted in frame 54, as by a press fit. The housing 52 is provided with a longitudinal bore 64 whose center line coincides with the center line of the first order beams 32. The center of the housing is relieved to form a cavity 66 through which the bore 64 passes to form two cylindrical chambers which receive the lens 42 and aperture stop 46.

Mounted concentrically within the lens chamber 64 is a tubular lens spacer 68 which locates the mounting position of the lens 42. A second lens spacer 70 separates the lens 42 from a retainer nut 72 which secures the assembly within the lens cavity 64. Extending into the housing cavity 66 and concentrically arranged with the lens cavity 64 is a lens cover 74 which is tubularly constructed with one end of the lens cover 74 stepped at 75 both internally and externally. The external surfaces of the lens cover are painted with a flat black paint or other suitable material to absorb scattered light reflected from the reflective surface of the aperture plate 46.

The aperture stop chamber 64 receives an aperture stop mounting collar 76 which has a pin 78 radially extending from its cylindrical surface in a downward direction. The pin 78 engages a groove 80 in the lower surface of the aperture stop chamber 64 to retain the alignment of the aperture 48 during adjustment of the collar 76.

The collar 76 is retained within the aperture chamber 64 by set screws 80 and by a spring clip 82 located in a groove 84 within the cylindrical surface of the chamber bore 64. The inner end of the chamber bore 64 is provided with a shoulder 66 against which the collar 76 is retained by the clip 82 which prevents movement of the collar along the longitudinal axis of bore 64. Adjustment of the set screws 80, which are located at 120 degrees about the collar, adjust the collar in a plane normal to the axis of beam 32. Thus, adjustment of set screws 80 adjusts the aperture 48 to assure that it properly blocks the undesired zero order, second order and negative first order beams while allowing the passage of the desired first order beams.

The housing 52 is provided with a cover 88 for closeing the cavity 66. The lower or inner surface of the cover 88 has inwardly extending steps 89 which interact with the steps 75 on the lens cover 74 to provide a baffle that absorb the undesired light beams reflected from the reflective surfaced aperture stop 46. The inner surface of the housing cover 88, like the lens cover 74, is painted with a flat black paint or similar absorptive material.

The second lens 50 is mounted within a mounting angle 90 that is secured to the frame 54 by a fastener, such as the nut 56 and screw 58 which pass through a slotted opening 91 within the base of the mounting angle 90. The lower surface of the mounting angle 90 is also channeled at 92 to fit about a pin 62 and permit the adjustment of the angle 90 along the center line of beam 32. The lens 50 is mounted within a bore 94 found within mounting angle 90 and secured therein as by bonding.

In operation, the laser 14 produces a laser beam 26 which is passed through the acousto-optic modulator 16 and split by a plurality of frequencies applied to terminals 30. The first order beam 32 resulting from the multifrequencies applied to the modulator 16 is split into a plurality of desired beams which are separated by 1 to 1.5 milliradians. With such a narrow separation, a useful system would not be available in a small package unless a lens 42 and aperture stop 46 were utilized to shorten the focal length and enhance beam separation. The lens 42 focuses the split first order beams 32' upon a focal plane 44 at which is located the aperture stop 46. An aperture 48 within the stop is adjustably arranged to pass the desired first order beams 32' while reflecting the undesired zero order, negative first order and second order beams 34, 38 and 36, respectively, from its surface. The surface of the aperture stop 46 is tilted at an angle of approximately 15 degrees to a plane normal to the beams 32. The plane of the aperture stop 46 is arranged to tilt about the vertical line formed by the split beams so that each beam falls upon the reflective surface at its focus point. It should be remembered that FIG. 2 does not depict this relationship since the aperture 46 is shown rotated 90 degrees for clarity. The reflected beams are absorbed within the blackened surface of cavity 66 which relies upon the stepped internal surfaces of the lens cover 68 and housing cover 88.

The aperture 48 within plate 46 which is arranged to pass the desired first order beams is sized at approximately 0.026 inches. The leading edge or edge that first encounters the beam 32' is sharp with its edge blackened in a manner similar to the cavity. As the aperture passes from the leading edge toward the outer surface of the plate 46 it is radially expanded to allow for the passage of light therethrough and to prevent diffraction. A second lens 50 may be utilized to refocus the first order beam 32' into a collimated beam 32" for use within the system.

While the present invention has been described with four first order beams and with specific dimensions, it will be understood that a single beam, two beams or more than four beams may be generated by the acousto-optic modulator. It is also understood that the aperture plate can be treated, as by painting, to absorb the unwanted beams directly without resorting to reflection and absorption baffles, as shown in FIG. 2. Clearly, other modifications and variations of the present invention will become apparent to those skilled in the art; and the present invention should be limited only by the appended claims.

An example of a method of sequentially applying several frequencies to the acousto-optic modulator may be found in the copending patent application for SEQUENTIAL BEAM SWITCHING OF ACOUSTO-OPTIC MODULATOR by John L. Tregay, Ser. No. 160,765, filed simultaneously with the present application and assigned to the present assignee.

I claim:

1. An aperture stop for use in an optical system, comprising:
    a source of cohereent light which forms a light beam;
    an acousto-optic modulator through which said light beam is passed;
    a frequency source connected to said acousto-optic modulator for splitting said coherent light beam into a plurality of beams including a desirable first order beam and a number of undesirable zero order, negative first order and second order beams;
    lens means for focusing said plurality of beams upon a focal plane; and
    stop plate means having an aperture therein mounted at said focal plane;
    said stop plate means aligned to permit sole passage of said desirable first order beam through said aperture;
    said stop plate means aligned at an angle to said plurality of beams to absorb said number of undesirable zero order, negative first order and second order beams;
    said frequency source being a multi-frequency source which causes said acousto-optic modulator to split said coherent light beam into a plurality of beams including a number of desirable first order beams.

2. An aperture stop for use in an optical system, as claimed in claim 1, wherein:
    said multi-frequency source connected to said acousto-optic modulator is sequentially pulsed from one of said multi-frequencies to another to cause said modulator to produce said number of desirable first order beams sequentially.

3. An aperture stop for use in an optical system, as claimed in claim 1, wherein:
    said source of coherent light is a laser which produces a collimated light beam.

4. An aperture stop for use in an optical system, as claimed in claim 1, wherein:
    said stop plate means is coated with an absorptive layer to absorb said number of undesirable beams.

5. An aperture stop for use in an optical system, as claimed in claim 1, wherein:
    said stop plate means is coated with a reflective layer to reflect said number of undesirable beams.

6. An aperture stop for use in an optical system as claimed in claim 5, additionally comprising:
    a lens and stop plate housing for mounting said lens means and said stop plate means at an angle thereto;
    said housing having an internal cavity with stepped interior walls for baffling said reflected number of undesirable beams.

7. An aperture stop for use in an optical system as claimed in claim 6, additionally comprising:
    a lens cover mounted within said housing having an internal longitudinal passage for said plurality of beams and a stepped external surface for further baffling said reflected number of undesirable beams.

8. An aperture stop for use in an optical system, as claimed in claim 1, wherein said stop plate means additionally comprises:
    a housing for mounting said lens means and stop plate means;
    a mounting collar for mounting said stop plate means within said housing at an angle to said plurality of beams;
    a plurality of adjustable means mounted within said housing and radiating toward said mounting collar for adjusting the location of said collar, said stop plate means mounted therein and, thus, said aperture.

9. An aperture stop for use in an optical system, as claimed in claim 1, additionally comprising:
second lens means for refocusing said desirable first order beam for use by said system.

10. An aperture stop assembly for use in a laser beam optical system, comprising:
means for producing a plurality of laser beams;
lens means for focusing said plurality of laser beams upon a focal plane; and
stop means located at said focal plane having an aperture located therein to pass a desired number of said plurality of laser beams and to block an undesired number of said laser beams;
said plurality of laser beams being focused in a straight line at said focal plane; and
said stop means located at an angle to said plurality of laser beams to absorb said blocked, undesirable laser beams;
said stop means being located at said focal plane and aligned at an angle to said focal plane such that said stop means intersect said focal plane along a line which coincides with said straight line formed by said focused laser beams;
said means for producing a plurality of laser beams including an acousto-optic modulator and being adapted to produce a number of desirable first order beams and a number of undesirable zero order, negative first order and second order beams;
said stop means being coated with an absorptive layer to absorb said plurality of laser beams and being coated with a reflective layer to reflect said blocked, undesirable laser beams away from said focal plane.

11. An aperture stop assembly for use in a laser beam optical system, comprising:
means for producing a plurality of laser beams;
lens means for focusing said plurality of laser beams upon a focal plane;
stop means located at said focal plane having an aperture located therein to pass a desired number of said plurality of laser beams and to block an undesired number of said laser beams; and
baffle means;
said stop means located at an angle to said plurality of laser beams to absorb said blocked, undesirable laser beams;
said means for producing a plurality of laser beams including an acousto-optic modulator and being adapted to produce a number of desirable first order beams and a number of undesirable zero order, negative first order and second order beams;
said stop means being coated with an absorptive layer to absorb said plurality of laser beams and being coated with a reflective layer to reflect said blocked, undesirable laser beams away from said focal plane;
said baffle means receiving said reflected laser beams and preventing the further reflection thereof.

* * * * *

UNITED STATES PATENT AND TRADEMARK OFFICE
CERTIFICATE OF CORRECTION

PATENT NO. : 4,362,364
DATED : December 7, 1982
INVENTOR(S) : Albert H. Smith

It is certified that error appears in the above—identified patent and that said Letters Patent is hereby corrected as shown below:

Column 4, line 6, change "40" to --48--

Column 5, line 66, change "cohereent" to --coherent--

Signed and Sealed this

Eighth Day of March 1983

[SEAL]

Attest:

GERALD J. MOSSINGHOFF

Attesting Officer     Commissioner of Patents and Trademarks